(12) United States Patent
Boden et al.

(10) Patent No.: US 7,107,614 B1
(45) Date of Patent: Sep. 12, 2006

(54) SYSTEM AND METHOD FOR NETWORK ADDRESS TRANSLATION INTEGRATION WITH IP SECURITY

(75) Inventors: Edward B. Boden, Vestal, NY (US); Mark J. Melville, Endwell, NY (US); Tod A. Monroe, Endicott, NY (US); Frank V. Paxhia, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,215

(22) Filed: May 23, 2000

Related U.S. Application Data

(63) Continuation-in-part of application No. 09/240,720, filed on Jan. 29, 1999.

(51) Int. Cl.
G06F 15/173 (2006.01)
H04L 9/00 (2006.01)
G06F 15/16 (2006.01)

(52) U.S. Cl. .................. 726/15; 713/151; 713/160
(58) Field of Classification Search .......... 713/201, 713/160, 151; 709/244–245; 726/15
See application file for complete search history.

(56) References Cited

U.S. PATENT DOCUMENTS

| | | | |
|---|---|---|---|
| 5,550,984 A | 8/1996 | Gelb ............... | 395/200.17 |
| 5,640,456 A | 6/1997 | Adams, Jr. et al. ........ | 380/49 |
| 5,757,924 A | 5/1998 | Friedman et al. ........ | 380/49 |
| 5,761,201 A | 6/1998 | Vaudreuil ............ | 370/392 |
| 5,793,763 A | 8/1998 | Mayes et al. .......... | 370/389 |
| 5,825,891 A | 10/1998 | Levesque et al. ....... | 380/49 |
| 5,828,893 A | 10/1998 | Wied et al. ........... | 395/800 |
| 5,835,726 A | 11/1998 | Shwed et al. ......... | 395/200.59 |
| 6,047,325 A | 4/2000 | Jain et al. ............ | 709/227 |
| 6,055,236 A | 4/2000 | Nessett et al. | |
| 6,226,751 B1 * | 5/2001 | Arrow et al. .......... | 713/201 |
| 6,353,614 B1 * | 3/2002 | Borella et al. ........ | 370/389 |
| 6,697,354 B1 * | 2/2004 | Borella et al. ........ | 370/352 |
| 2002/0002621 A1 * | 1/2002 | Zhang et al. .......... | 709/238 |

FOREIGN PATENT DOCUMENTS

| | | |
|---|---|---|
| EP | 1130846 A2 | 9/2001 |
| JP | 11-196135 | 7/1999 |
| JP | 2000-224219 | 8/2000 |
| JP | 2001-016255 | 1/2001 |
| JP | 2001-035244 | 2/2001 |
| WO | 00/56034 A1 | 3/1999 |
| WO | WO 99/35799 | 7/1999 |
| WO | 00/78008 A1 | 12/2000 |

OTHER PUBLICATIONS

P. Srisuresh,Security Model with Tunnel-mode IPsec for NAT Domains, Oct. 1999, Network Working Group, pp. 1-10.*
Allied Telesyn, NAT, GRE, and Security Associations, May 1998, pp. 1-5□□http://www.alliedtelesyn.co.nz/solutions/examples/pdf/ex3_76.pdf.*

(Continued)

Primary Examiner—Hosuk Song
Assistant Examiner—Linh LD Son
(74) Attorney, Agent, or Firm—Shelley M. Beckstrand

(57) ABSTRACT

IP security is provided in a virtual private network using network address translation (NAT) by performing one or a combination of the four types of VPN NAT, including VPN NAT type 'a source-outbound' IP NAT, VPN NAT type 'b destination-outbound, VPN NAT type 'c inbound-source' IP NAT, and VPN NAT type 'd inbound-destination' IP NAT. This involves dynamically generating NAT rules and associating them with the manual or dynamically generated (IKE) Security Associations, before beginning IP security that uses the Security Associations. Then, as IP Sec is performed on outbound and inbound datagrams, the NAT function is also performed.

17 Claims, 8 Drawing Sheets

OTHER PUBLICATIONS

Allied Telesyn, NAT and Security Associations, May 1998, pp. 1-4 http://www.alliedtelesyn.co.nz/solutions/examples/pdf/ex1_76.pdf.*

"Virtual Private Networks on Vendor Independent Networks", *IBM Technical Disclosure Bulletin*, vol. 35, No. 4A Sep. 1992 pp. 326-329.

P. Srisuresh, *Security Model with Tunnel-mode IPsec for NAT Domains.* Network Working Group, Request for Comments (RFC): 2709, Oct. 1999, 11 pages. [<draft-ietf-nat-security-00.txt>].

Hiroaki Hayashi, "Management of Remote Access and Design of Security," Open Design, vol. 4, No. 2, Apr. 1, 1997, pp. 84-93, CQ Publishing Co., Ltd.

* cited by examiner

SYSTEM AND METHOD FOR NETWORK ADDRESS TRANSLATION INTEGRATION WITH IP SECURITY

CROSS REFERENCES TO RELATED APPLICATIONS

This application is a Continuation-In-Part (CIP) of Ser. No. 09/240,720, filed 29 Jan. 1999, entitled "System and Method for Network Address Translation Integration With IP Security".

U.S. patent application Ser. No. 09/239,693, filed Jan. 29, 1999, entitled System and Method for Managing Security Objects; Ser. No. 09/240,718, filed Jan. 29, 1999, entitled "System and Method for Dynamic Macro Placement of IP Connection Filters"; Ser. No. 09/239,694, filed Jan. 29, 1999, entitled "System and Method for Dynamic Micro Placement of IP Connection Filters"; Ser. No. 09/240,483, filed Jan. 29, 1999, entitled "System and Method for Central Management of Connections in a Virtual Private Network, are assigned to the same assignee hereof and contain subject matter related, in certain respects, to the subject matter of the present application. The above-identified patent applications are incorporated herein by reference.

BACKGROUND OF THE INVENTION

1. Technical Field of the Invention

This invention pertains to security over virtual private network (VPN) connections. More particularly, it relates to VPN NAT, or concurrent use of network address translation (NAT) and Internet Protocol (IP) Security (IPSec) protocols.

2. Background Art

Virtual Private Networks (VPNs) are an active area of technical development throughout the Internet and computing industry. This is because they are a fundamental enabler for most forms of e-business. VPNs use protocol tunneling and encryption and decryption technology (IP Security protocols) to allow clients and servers, branch offices, or independent organizations to exploit the Internet for their TCP/IP traffic at much lower costs than buying dedicated lines, without losing a key benefit of dedicated lines: privacy.

The tunneling that VPN employs has a side effect, which creates a problem: two subnets or companies, or other users, which didn't initially communicate directly, now do, and this greatly increases the likelihood of IP address conflicts.

Network Address Translation (NAT) is widely deployed in Internet and in companies connecting to the Internet to overcome address conflicts. These conflicts commonly occur between designated 'private' address spaces (e.g. 10.*.*.*).

However, NAT and IP Security (IP Sec) are architecturally conflicting. In fact, NAT breaks IP Sec. That is, NAT "is the feature which finally breaks the semantic overload of the IP address as both a locator and the end-point identifier" (see, "Architectural Implications of NAT", draft-iab-nat-implications-00.txt, March 1998. IPSec is described in Kent, S., and Atkinson, "Security Architecture for the Internet Protocol", RFC2401, November 1998; Kent, S., and Atkinson, "IP Authentication Protocol", RFC 2402, November 1998; and Kent, S., and Atkinson, "IP Encapsulation Security Payload", RFC 2406, November 1998.) As a result, two hosts cannot establish an IP Sec connection if there is a NAT system in between. There are two reasons why. First, the IP traffic that flows between the two hosts (for the IP Sec connection) will have authentication protocol (AH) or encapsulation security payload (ESP) applied. (See RFC's 2402 and 2406, supra.)

First, with respect to ESP in tunnel mode, the IP address that needs to be translated is inside the ESP tunnel and is encrypted. It is, therefore, unavailable to NAT. With respect to AH in transport or tunnel mode, the IP address that needs to be translated is visible in NAT, but the AH authentication includes it. Therefore, changing the IP address will break the authentication at the remote end of the IP Sec connection. With respect to ESP in transport mode, even if ESP is used with authentication, the IP address is available to NAT. But, if the IP address is changed, the IP Sec connection breaks due to the breaking of authentication at the remote end of the IP Sec connection.

Second, even if the IP traffic for the IP Sec connection could be translated, it would fail because the IP Sec connection is based on Security Associations which contain the two host IP addresses. These are fundamental to the Security Association architecture (see RFC 2401, supra), in that the inbound IP Sec, on the host where decrypting (or authentication) is to occur, must be uniquely determined by the triple:

{destination IP addr, SPI, IP Sec protocol}.

where SPI is the security protocol index (see, RFC 2401, supra).

For example, given hosts A & W, assume NAT is applied to an IP datagram (a generic term for bytes that go on the wire) with ESP in transport mode that is going from A to W. Hence the IP source address is changed. Upon arrival at W, the packet will probably be decrypted successfully since that doesn't depend on IP source address (which was in plaintext—not tunneled). If strictly implemented however, the inbound SPD checking which should follow decrypting will fail, due to the changed IP source address (because it was not the address used to negotiate the security association). So, even the transport mode ESP case fails.

Simply making NAT and IP Sec mutually exclusive is not the solution sought by the art. NAT is being deployed widely because it solves many problems, such as: masks global address changes, lowers address utilization, lowers Internet service provider (ISP) support burden, and allows load sharing as virtual hosts.

Yet, NAT is viewed as the greatest single threat to security integration being deployed in the Internet today. This "NAT problem", as it is invariably termed, is architecturally fundamental. Yet, legacy applications and services (for example, those developed for IP version 4) will continue to a long co-existence as applications and services develop for IP version 6. Consequently, there is a great need in the art for providing NAT and IP Sec coexistence, at least in selected situations, and to do so without introducing serious configuration problems. (IP version 4 is described in "Internet Protocol", RFC791, September 1981. IP version 6 is described in Deering, S., Hinden, R., "Internet Protocol, Version 6 (IPv6) Specification", RFC2460, December 1998.)

A VPN connection between two address domains can have the effect of directly connecting two domains which most likely will not been planned to be connected. Hence increased use of VPNs is likely to increase address conflicts. It is also understood that VPNs redefine network visibility and increase the likelihood of address collision when traversing NATs. Address management in the hidden space behind NATs will become a significant burden. There is, therefore, a need in the art to ameliorate that burden.

In U.S. patent application Ser. No. 09/240,720, a solution to the general problem of integrating IP Sec and NAT is presented. IP security is provided in a virtual private network using network address translation (NAT) by performing one or a combination of the four types of VPN NAT. (Three types of VPN NAT will be futher described hereafter, and the fourth is described in copending patent application Ser. No. 09/595,950, filed 16 Jun. 2000.) This involves dynamically generating NAT rules and associating them with the manual or dynamically generated Internet key exchange (IKE) Security Associations, before beginning IP security that uses the Security Associations. (See, Harkins, D., Carrel, D., "The Internet Key Exchange (IKE)", RFC2409, November 1998. Security Associations is a term defined in RFC201, supra.) Then, as IP Sec is performed on outbound and inbound datagrams, the NAT function is also performed. By "perform IP Sec", is meant to execute the steps that comprise IP Sec outbound or inbound processing, as defined by the 3 IP Sec RFCs (and others) above. By "perform NAT", is meant to execute the steps that comprise the VPN NAT processing hereafter described in this application.

In U.S. patent application Ser. No. 09/240,720, the customer must configure each separate VPN NAT rule as a separate VPN connection. This is time consuming and prone to error, and VPN connections are really meant to protect the traffic and should be independent of specific VPN NAT rules. That is, the rules have heretofore been one to one—NAT thus increases the number of VPN connections required.

It is an object of the invention to provide an improved and greatly simplified system and method for concurrently implementing both Network Address Translation (NAT) and IP Security (IP Sec).

It is a further object of the invention to provide a system and method for solving the increased likelihood of IP address conflicts inherent in the use of a virtual private network (VPN).

It is a further object of the invention to provide a system and method for enabling utilization of VPNs without requiring re-addressing a domain (an expensive alternative).

It is a further object of the invention to provide a system and method for VPN NAT which is accomplished entirely in the IP Sec gateway without requiring changes in domain hosts.

It is a further object of the invention to provide a system and method for VPN NAT which requires no, or only minor, changes to routing in each connected domain.

It is a further object of the invention to provide a system and method for VPN NAT which is simple to configure.

It is a further object of the invention to provide a solution to the address collision problems caused by VPNs.

It is a further object of the invention to provide a simplified solution for customer configuration of VPN connections.

It is a further object of the invention to allow a single VPN connection to support multiple VPN NAT rules.

It is a further object of the invention to provide a system and method which, on a system wide basis, avoids conflict among the implicitly, or dynamically assigned, VPN NAT rules.

It is a further object of the invention to provide a system and method which reduces system overhead for dynamic NAT rules by eliminating the need to manage numerous separate VPN connections for each NAT rule.

It is a further object of the invention to provide a VPN NAT system and method which simplifies network monitoring and traffic analysis.

SUMMARY OF THE INVENTION

In accordance with the invention, IP security is provided in a virtual private network using network address translation (NAT) by performing one or a combination of types of VPN NAT. This involves dynamically generating a set of NAT rules and associating the set with the manual or dynamically generated (IKE) Security Associations, before beginning IP security that uses the Security Associations. Just before IP Sec is performed on outbound datagrams, a specific rule is chosen from the set of NAT rules associated with a connection, and the NAT function is performed, followed by IP Sec. Just after IP Sec is performed on inbound datagrams, a specific rule is chosen from the set of NAT rules associated with a connection, and the NAT function is performed.

Other features and advantages of this invention will become apparent from the following detailed description of the presently preferred embodiment of the invention, taken in conjunction with the accompanying drawings.

Figure 1:
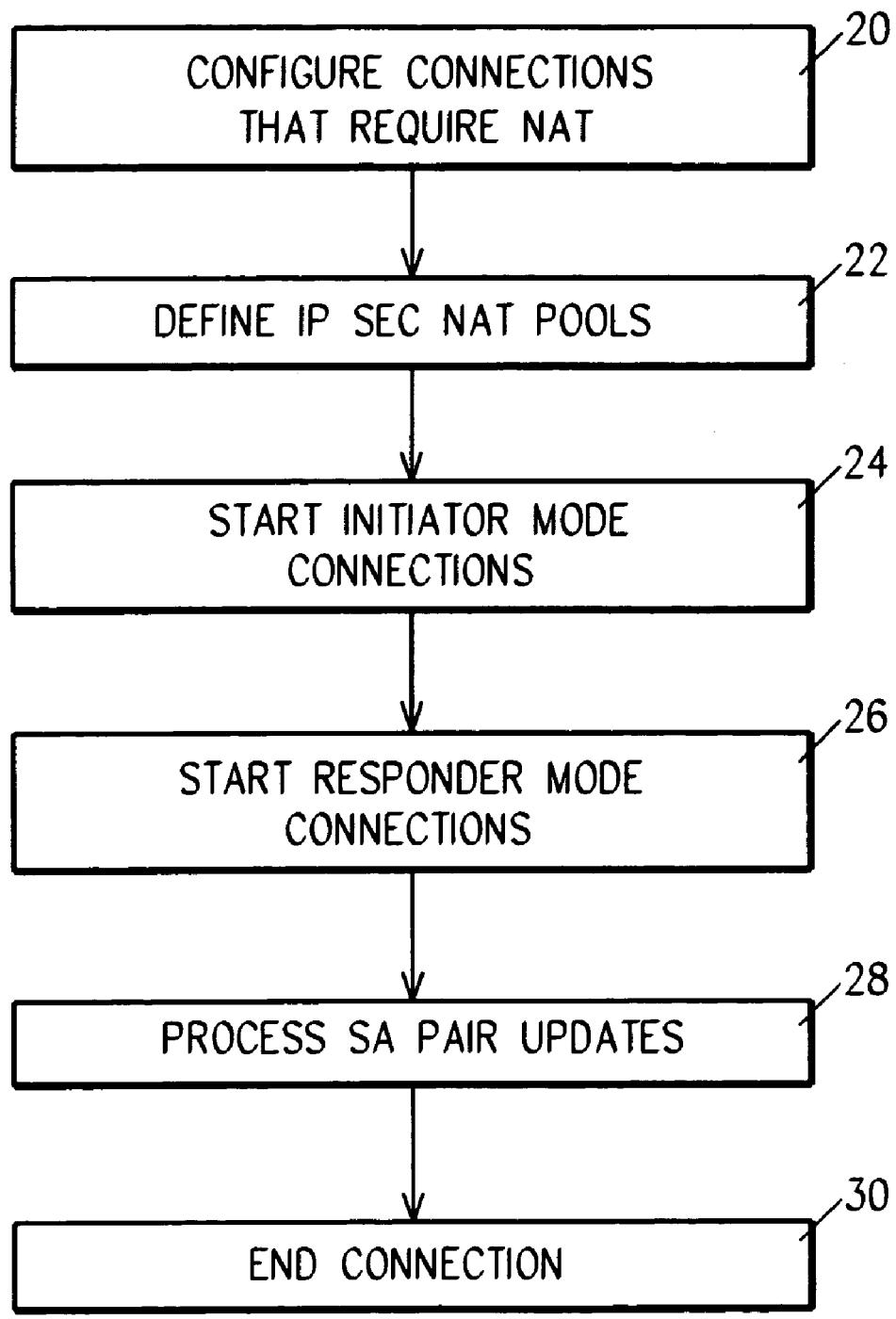
FIG. 1 is a flow diagram of the VPN NAT method of the preferred embodiment of the invention.

(Type b relates to 'destination-out' VPN NAT.)

BEST MODE FOR CARRYING OUT THE INVENTION

In accordance with the preferred embodiment of the invention, the NAT problem is addressed through functions VPN NAT with multiple NAT translation rules applied to a single VPN connection, rather than a single NAT translation rule. This greatly simplifies customer configuration. Previously, each address requiring NAT and VPN had to be configured separately. In accordance with the present invention, with reference U.S. patent application Ser. No. 09/240, 720, additional function is provided for 'type a source-out' and 'type d destination-in' VPN NAT. To avoid dysfunctional IP Sec connections with the accidental use of HIDE and MAP NAT rules (aka conventional NAT), AH or ESP is checked for during conventional NAT. HIDE and MAP NAT rules are two basic forms of conventional NAT described hereafter in connection with FIGS. 3 and 4. If a given NAT rule would apply to the IP packet, except for the AH or ESP header, address translation is not done. This applies to inbound and outbound NAT. So, the effect is that for conventional NAT (versus VPN NAT for IP Sec, or IP Sec NAT), preference is given to IP Sec. IP Sec overrides conventional NAT.

Since it is not known at the time the NAT rules are loaded whether or not any IP Sec connections might conflict (dynamic IP for example), checking for such problems cannot be done until actual NAT processing in the operating system kernel. User visibility to these actions is provided, if journaling is on for the rule, by indicating in a journal entry that a NAT rule fits the datagram, but was not done due to IP Sec. In addition, operating system kernel information logging of these actions may be provided for some limited number of occurrences per conventional NAT rule. Similarly, a message per connection, rather than per occurrence, may be provided in a connection manager job log or in a connection journal. "Journaling" and "journal entry" are terms also referring to what is typically known in the art as "logging" and "log entry", respectively.

Pursuant to the invention described in the parent application, referred to as VPN NAT, to allow NAT to be used with IP Sec at the IP Sec gateway, customers retain private internal IP addresses, and increased address collision is avoided by having IP Sec connections begin and end at the IP Sec gateway. An IP Sec gateway is a term defined in RFC2401, supra. The term "VPN connection" is another term referring to what is generally called an "IP Sec tunnel", the latter being defined in RFC2401, supra.

Further in accordance with the parent application, virtual private networks (VPN) are provided in both initiator and responder modes with an integrated NAT function. Security associations are negotiated using the proper external (NAT rhs) IP addresses, and the NATing of corresponding internal (NAT lhs) IP addresses is done by generated NAT rules, in sync with connection load to IPsec and IPSec processing in Operating system kernel. Inbound source IP addresses are translated, as well as the usual source IP address NAT on outbound (with corresponding translation of destination IP address on inbound). A 'VPN NAT rule' is represented by blocks 126, 124 in FIG. 5; that is, the 2 sets of lhs and rhs addresses comprise a VPN NAT rule.

In accordance with the present invention, a single VPN connection supports multiple VPN NAT rules by allowing the customer to specify a class of NAT rules associated with a VPN connection, and allow the system to dynamically generated a specific NAT binding (rule) out of this class. Further, on a system wide basis, conflict among the implicitly, or dynamically assigned, VPN NAT rules is avoided by associating customer configured NAT address pools with local IP addresses when the VPN NAT type is source inbound. The three types of VPN NAT of concern to this application are defined by Table 1, infra.

Referring to FIG. 1, the method of the preferred embodiment of the invention for executing VPN NAT includes in step 20 configuring connections that require NAT, in step 22 defining IPSec NAT address pools, in step 24 starting initiator mode connections, in step 26 starting responder mode connections (these are started at the other end of the connection), in step 28 processing SA pair updates, and in step 30 ending the connections. (A NAT pool is a set of IP addresses.) Each of these steps is further explained below.

In step 20, the user decides on and configures the connections that will require NAT. This is logically equivalent to writing NAT rules. The four cases to be considered in doing so are depicted in Table 1.

TABLE 1

TYPES OF VPN NAT

| | IDci (source) | IDcr (destination) |
|---|---|---|
| Initiator Mode | source-out type a.NAT internal address, IP src on outbound, IP dest on inbound. | destination-out type b.NAT |
| Responder Mode | source-in type c.NAT external address, IP src on inbound, IP dest on outbound. | destination-in type d.NAT internal address, IP dest on inbound, IP src on outbound. | where
IDci = 'identifier of client initiator',
IDcr = 'identifier of client responder'.

A VPN connection is defined as having four endpoints: two 'connection endpoints', and two 'data endpoints'. (Transport mode then means that the connection endpoint equals the data endpoint, at each end of the connection.) The IDci and IDcr terms refer to the two data endpoints, more specifically, by indicating which is the initiator and which is the responder (see, RFC2409, supra.) Also, these identifiers may take one of about six different forms, which are part of the IDcr, IDcr definitions. For this application, identifier types are not particularly relevant.

When specifying a specific instance of NAT in, for example, an IP Sec Policy database, the user makes a yes/no decision in, say, a check-box. As used herein, an IP Sec policy refers to the complete set of configured IP Sec information, on a system. This information is stored in what is termed the IP Sec database, or IP Sec policy database. Responder mode NAT flags IDci and IDcr may be part of the connection definition. The initiator mode flag may be part of the user client pair, associated with a 'local client ID' (only). The responder IDci and IDcr NAT flags can be set independently. Both are relevant only if the connection definition has external initialization mode.

Heretofore, in all cases, if the NAT flag was 'on', the corresponding granularity value was required to be 's' (scalar) in the connection definition. In accordance with the present invention, this is no longer a restriction with dynamic VPN NAT. That is, granularity of 'S' (scalar), 'f' (filter) and 'c' (client) are all supported. 'Granularity' is described in RFC2401, supra, at pages 15–16. In accordance with an exemplary embodiment of the invention, for example the IBM AS/400, 'granularity' is implemented as follows: each VPN connection has five selectors (fields in datagram that might be checked to determine if traffic should be in the VPN connection; these are: source IP, dest IP, source port, destination port and protocol. In accordance with this exemplary embodiment, when a VPN connection is started, each selector get its value from either (1) the policy filter for that VPN connection (for selector granularity 'f'), (2) single values from IKE (for selector granularity 's'), or (3) contiguous range of values from IKE (for selector granularity 'c').

Figure 2:
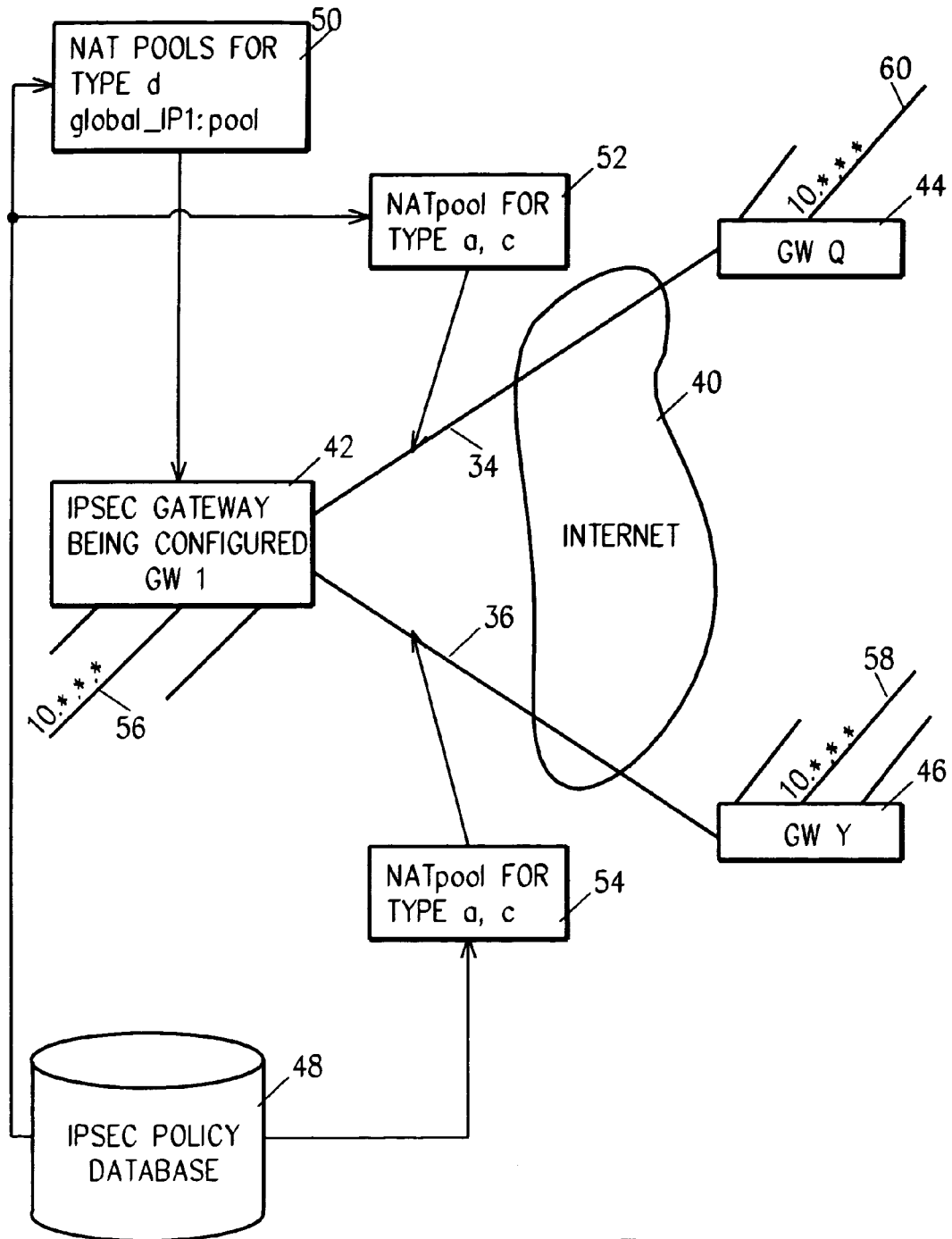
FIG. 2 illustrates typical IP Sec scenarios and associated VPN NAT pools.

Referring to FIG. 2, the manner in which VPN NAT IP pools relate to network scenarios is shown. Lines 34 and 36 represent IP Sec connections between gateways (GW) 42, 44 and 46 on Internet 40. NAT pools 52, 54 for types 'a source-out' and 'c source-in' are independently associated with each remote ID (gateway 44, 46). For type 'd destination-in' VPN NAT, a single pool 50 may be defined for global IP addresses that the VPN NAT gateway 42 owns. In this exemplary embodiment, IP SEC policies for NAT pools 50, 52, 54 are stored in IP SEC data base 48. In this example, all three internal networks 56, 58 and 60 use the same 10.*.*.* addresses space. This provides the initial value and motivation for VPN NAT: IP Sec tunnels (aka connections) between these internal networks 56, 58, 60 has a logical effect combining them. This cannot be done, in general, without address conflict. VPN NAT provides the solution to the problem presented to gateway (Gw 1) 42 when it needs to do business with hosts behind gateways (Gw Q) 44 and (Gw Y) 46 on internal networks 60 and 58, respectively.

In step 22, the user defines a set (in pools 50, 52 and 54) of IP addresses that are available for the exclusive use of the VPN NAT function. Each pool is preferably definable as a range of IP address, but could be a list of discontiguous addresses, and is naturally associated with remote ID and local ID IP Sec Policy database entities.

Referring to Table 2, the different meanings of each flavor of VPN NAT motivating the different pools are set forth. Although specified on a per remote ID or local ID basis, the pools may be managed as three distinct groups of IP addresses. This allows the user to specify, for example, the same range for multiple remote ID's. The letters a, c and d correspond to the VPN NAT types (Table 1). The column 'lr?' means locally routable (as distinguished from globally routable.)

TABLE 2

IP SEC NAT POOLS

| IP Sec NAT pools | Pool purpose | Effective generated outbound NAT rule | lr? |
|---|---|---|---|
| a. Locally initiated connections | 1. Hide own IP translate addresses from remote hosts<br>2. Avoid IP address conflict with remote GW<br>Hence, a pool may be associated with each remote ID. | "MAP srcIP TO <value from pool>". | yes |
| c. Remotely initiated connections | Avoid address conflict<br><br>Hence, a pool may be associated with each remote ID. | "map destIP to <value from pool>" | yes |
| d. Remotely initiated connections | 1. Provide a form of load sharing<br>2. Hide own IP addresses behind external address.<br>Hence, a pool may be associated with a globally routable IP address (IDcr). | "map srcIP to <value from pool>" | yes |

In step 24, initiator mode connections are started. When starting an initiator mode connection, the connection manager checks if the local client ID is to be translated. If so, the connection manager looks for an available IP address from NAT pool, say 52, associated with a remote ID in the database. Availability is determined by the connection manager as follows. The connection manager is a server which, running all of the time, starts and stops VPN connections and provides status. This server maintains a single (system-wide, since connection manager runs once per system) list of IP addresses that have been used in some active connection (states: starting, running or stopped) from any type 'a source-out' pool (see Table 1). The first IP address in the pool not in the used list, is chosen, and added to the used list. If an available IP address cannot be found, the connection is not started and an appropriate error message (and possibly return code to the OP NAV GUI) is generated. The policy database is not updated to show an IP address is in use—rather this is determined dynamically by the connection manager based solely on its set of active connections. An 'OP NAV GUI' is an "AS/400 Operations Navigator graphical user interface (GUI)", a PC-based GUI used to configure various aspects of AS/400, including VPN.

The start message (msg) sent by connection manager to IKE will have the NAT rhs IP address selected from the pool. The NAT rhs IP address is added to the security association (SA) pair, which is completed by the returned SAs from IKE. Connection manager then loads the connection to IPSec. An SA pair is two security associations (defined by RFC2401, supra), one inbound and one outbound.

IPSec generates NAT rules for the two SAs. On outbound, NAT will occur after filtering and before IPSec and on inbound, NAT will occur after IPSec (and before filtering, if any). In this sense, NAT is 'wrapping' the local connection endpoint of the IPSec connection.

Figure 3:
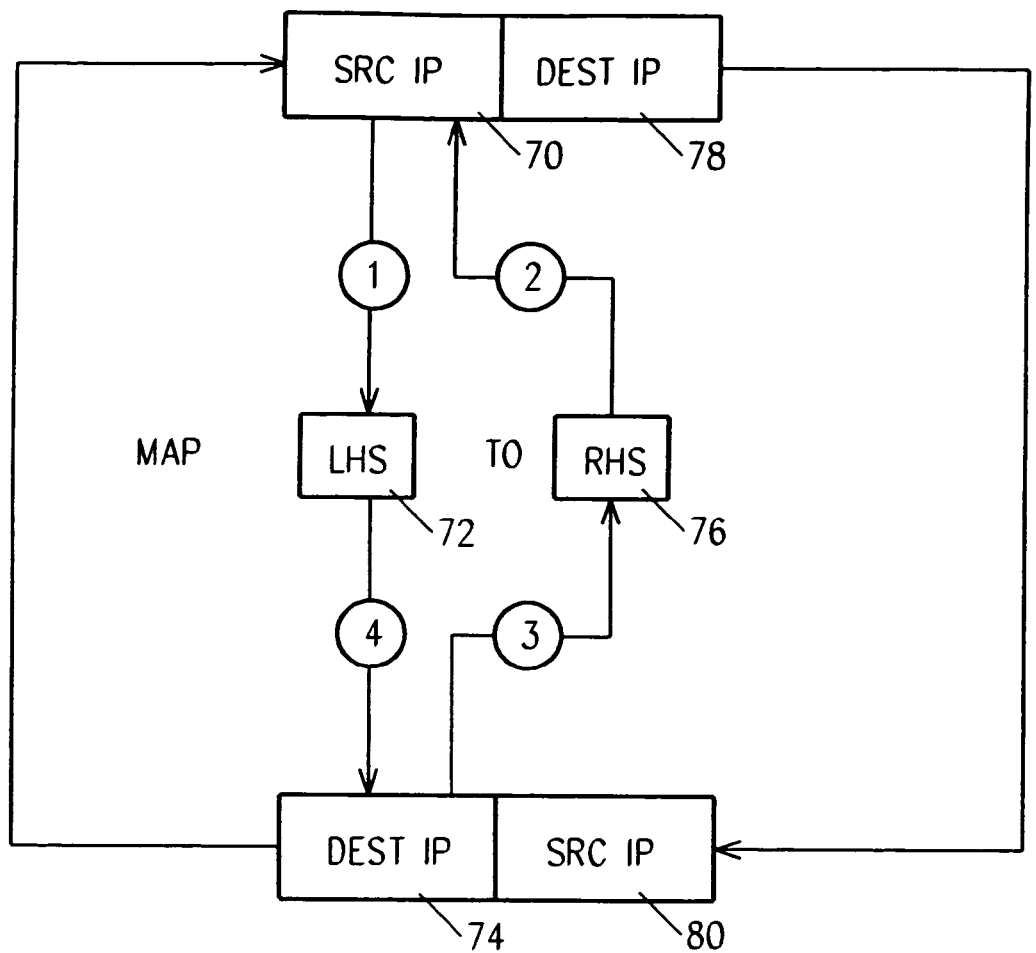
FIG. 3 illustrates static NAT, the simplest conventional NAT, for context.
Figure 4:
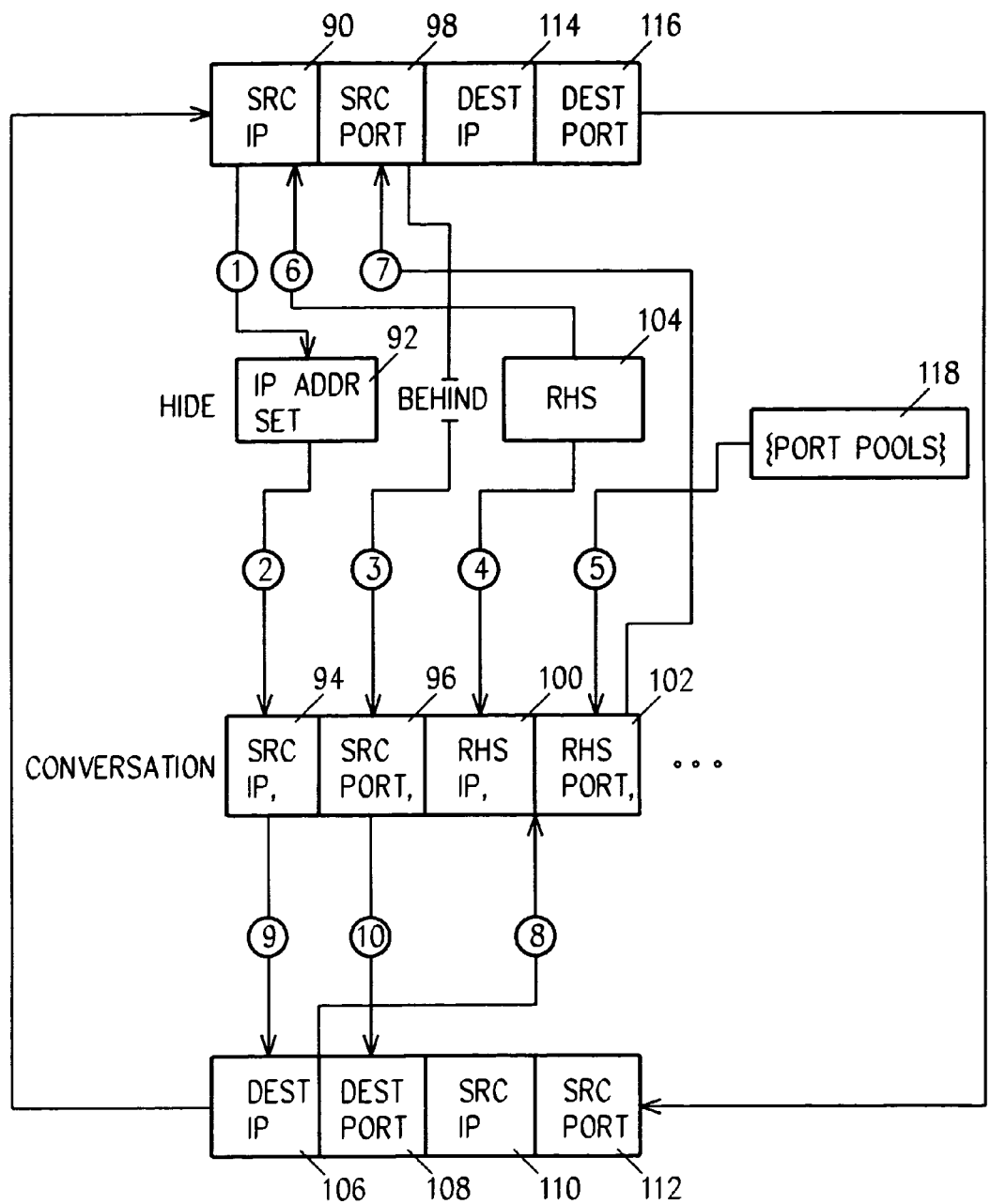
FIG. 4 illustrates masquerade NAT, a type of conventional NAT, for context.

Referring to FIGS. 3 and 4, conventional NAT functions are illustrated for background and contrast with later figures which show VPN NAT types according to the invention.

Referring to FIG. 3, static is the simplest form of NAT. Both conventional NAT types are explicitly configured by the user by writing the corresponding NAT rule statements via the OpNav GUI. This is in contrast to the IPSec NAT, in which the actual NAT rules or statements are generated by the system. The MAP statement <MAP lhs TO rhs> of FIG. 3 and the HIDE statement <HIDE ip addr set BEHIND rhs> of FIG. 4 are such statements.

Again referring to FIG. 3, on inbound processing, if source ip 70 matches lhs 72 in the MAP lhs TO rhs statement, then src ip 70 is translated to rhs 76. On outbound processing, if destination ip 74 matches rhs 76, then destination ip 74 is translated to lhs 72.

Referring to FIG. 4, masquerade NAT (also referred to as network address and port translation (NAPT)), uses the HIDE statement, supra, and provides many-to-one address translation by using its own port pools 118 (UDP, TCP) to remember how to translate the inbound traffic. Unlike static NAT (FIG. 3), masquerade NAT conversations <CONVERSATION src ip, src port, rhs ip, rhs port, . . . . > can only be initiated by internal (lhs) addresses. VPN NAT, a name used to identify the preferred embodiment of the present invention, as will be seen, is closer to static NAT, in that it does not include port translation.

Referring further to FIG. 4, in processing outbound datagrams, in step <1> if source ip address 90 is determined to be in the ip address set 92 of the HIDE statement, then in step <2> the CONVERSATION is set up by copying src ip 90 into CONVERSATION field 94, in step <3> source port 98 into field 96, in step <4> rhs 104 into field 100, and in step <5> the rhs port into field 102 from the correct pool in port pools 118. Then, in step <6> source ip 90 is translated to rhs 104, and in step <7> source port 98 is changed to rhs port 102. In processing inbound datagrams, if in step <8> destination ip address 106 and destination port 108 match CONVERSATION fields rhs ip 100 and rhs port 102, respectively, then in step <9> destination ip address 106 is translated to CONVERSATION source ip address 94 and in step <10> destination port 108 is translated to CONVERSATION source port 96.

Some special situations also handled by NAT are not illustrated because they are of no interest to the present invention. These include handling of special situations created by FTP or ICMP, both of which contain IP address that are translated. FTP=File Transfer Protocol (defined in RFC959), and ICMP=Internet Control Message Protocol (defined in RFC792). Checksum re-calculation is done. In masquerade NAT once a conversation exists, later datagrams are matched against that, rather than the original (precipitating) HIDE rule, the port pools are managed, conversations are timed and terminated, and ports are mapped. It is a particular advantage of the invention that VPN NAT supports ICMP and FTP (including the famous FTP PORT and PASV commands and attendant problems).

In accordance with the present invention, dynamically determined VPN NAT rules are implemented as follows. The customer specifies, via a graphical user interface (GUI) that VPN NATing is to be done. Multiple IP addresses are allowed for the source IP address of locally initiated connections. These multiple IP addresses are specified via range (contiguous) or address and mask. These constitute the VPN NAT rule left-hand-side (lhs) address set. The VPN NAT rule right-hand-side (rhs) address set is associated with the remote VPN gateway address. When a connection is started, both lhs and rhs address sets are loaded with the connection as part of the IP Sec Security associations for the connection. The VPN Connection manager then marks the rhs set as used to avoid NAT rule conflict, with connections started later.

As IP traffic occurs for a loaded (that is, installed into the operating system kernel), locally initiated, connection, the lhs and rhs address sets are used to determine what specific NAT rule should be applied to a particular datagram. The generation of a datagram-specific NAT rule is done by ordering each address set and each address in the lhs set is mapped, one-to-one, with the corresponding element of the rhs set. If the lhs set cardinality is larger than the rhs set, VPN NAT will not occur for the n elements of the lhs set where n>cardinality(rhs). (However, this may be prevented by audit at GUI level.) For outbound traffic, the n'th element of the lhs set is selected based on the datagram source IP address, and for inbound traffic the n'th element of the rhs set is selected based on (that is, equal to) the datagram destination IP address.

As IP traffic occurs for a loaded, remotely initiated connection (responder mode), the solution is essentially the same as for locally initiated connections, but reversed. In this case, the rhs set is matched against the inbound datagram destination IP address, which is mapped to the corresponding element of the lhs set. If the rhs set is greater than the lhs, NATing would simply not occur. Again, this may be undesirable from a human factor perspective, in which case it may be disallowed by audit at the GUI level.

Figure 5:
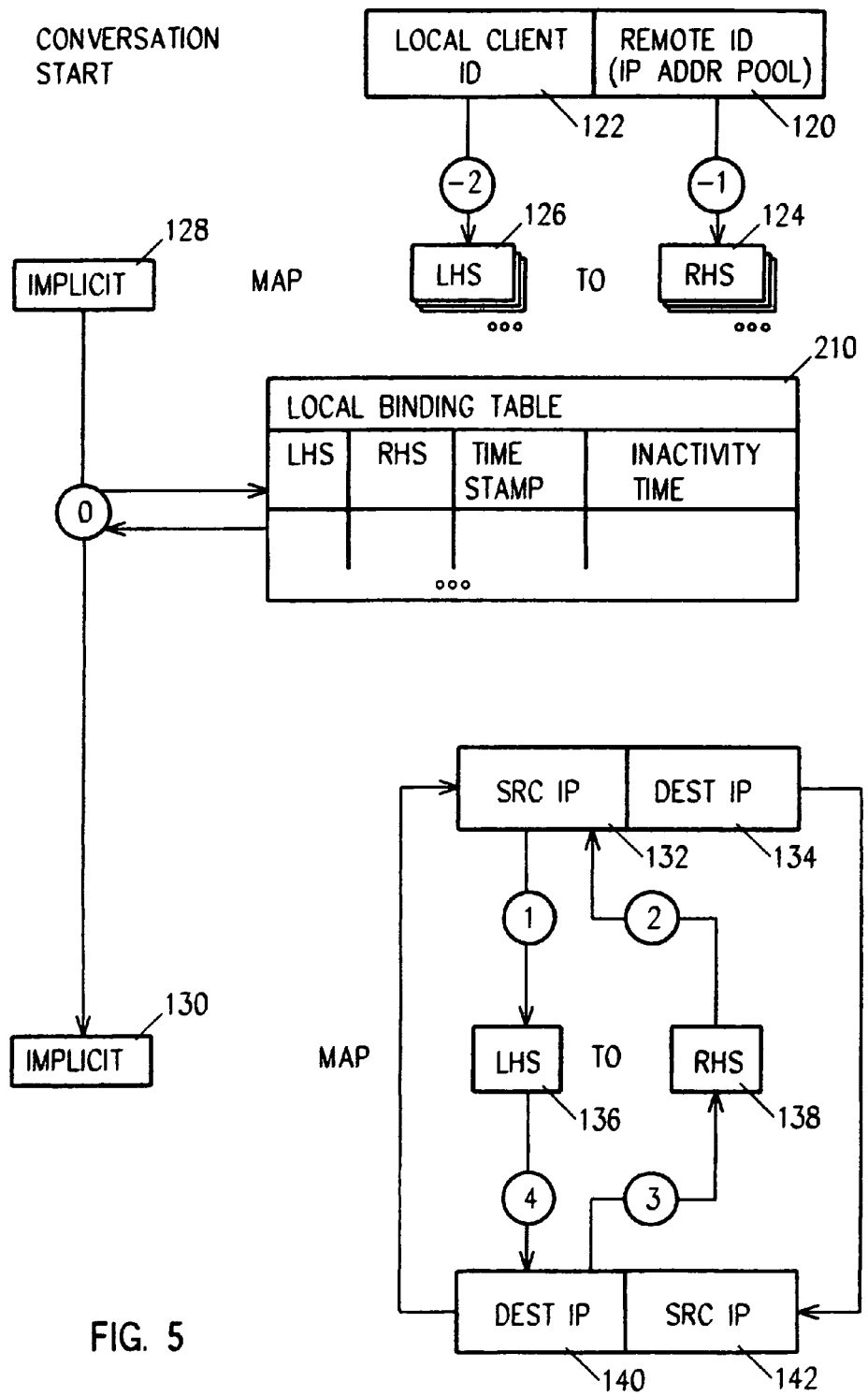
FIG. 5 illustrates VPN NAT, type a (aka 'source-out'): IDci translated for initiator-mode conversations.
Figure 6:
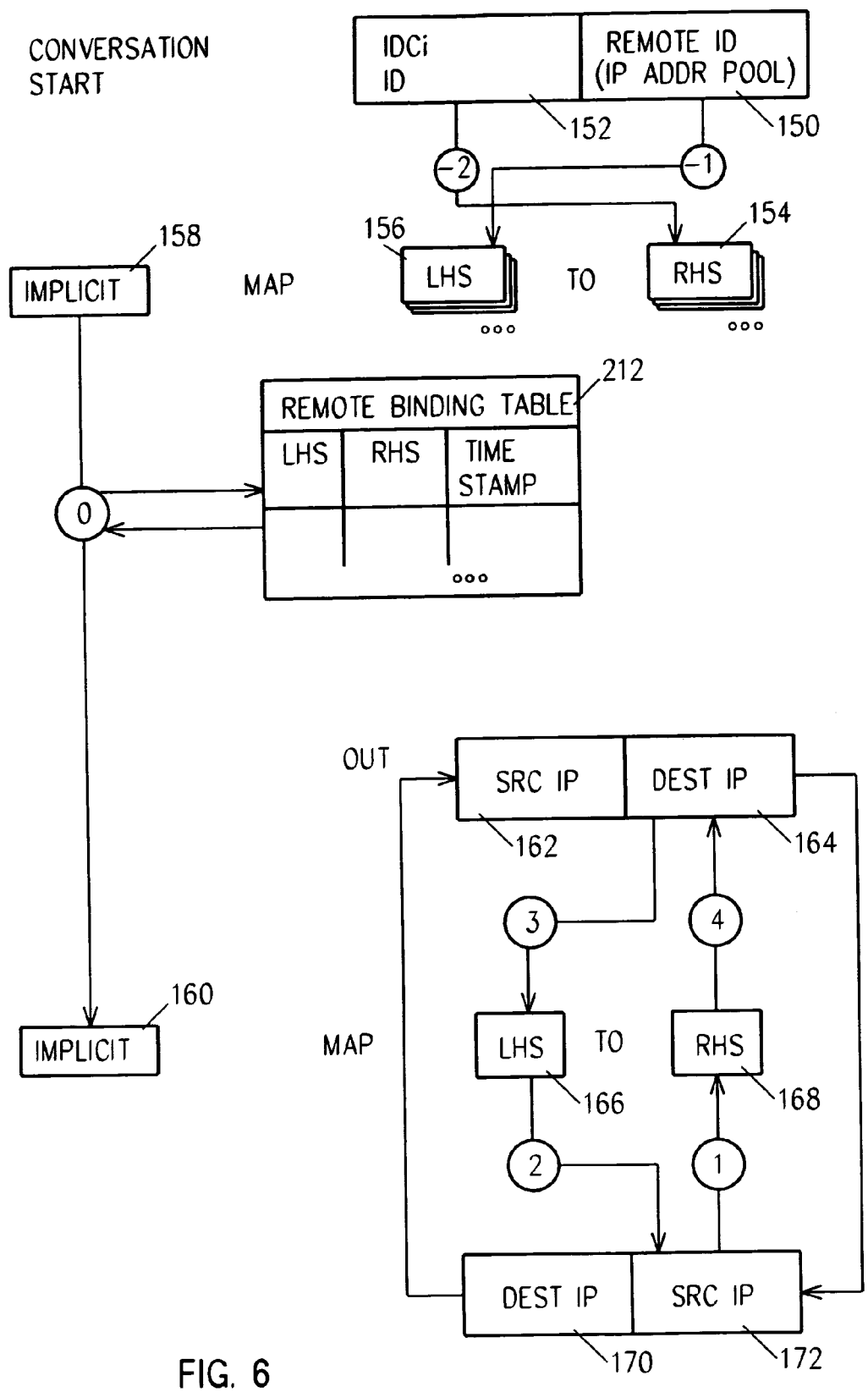
FIG. 6 illustrates VPN NAT, type c (aka 'source-in'): IDci translated for responder-mode conversations.
Figure 7:
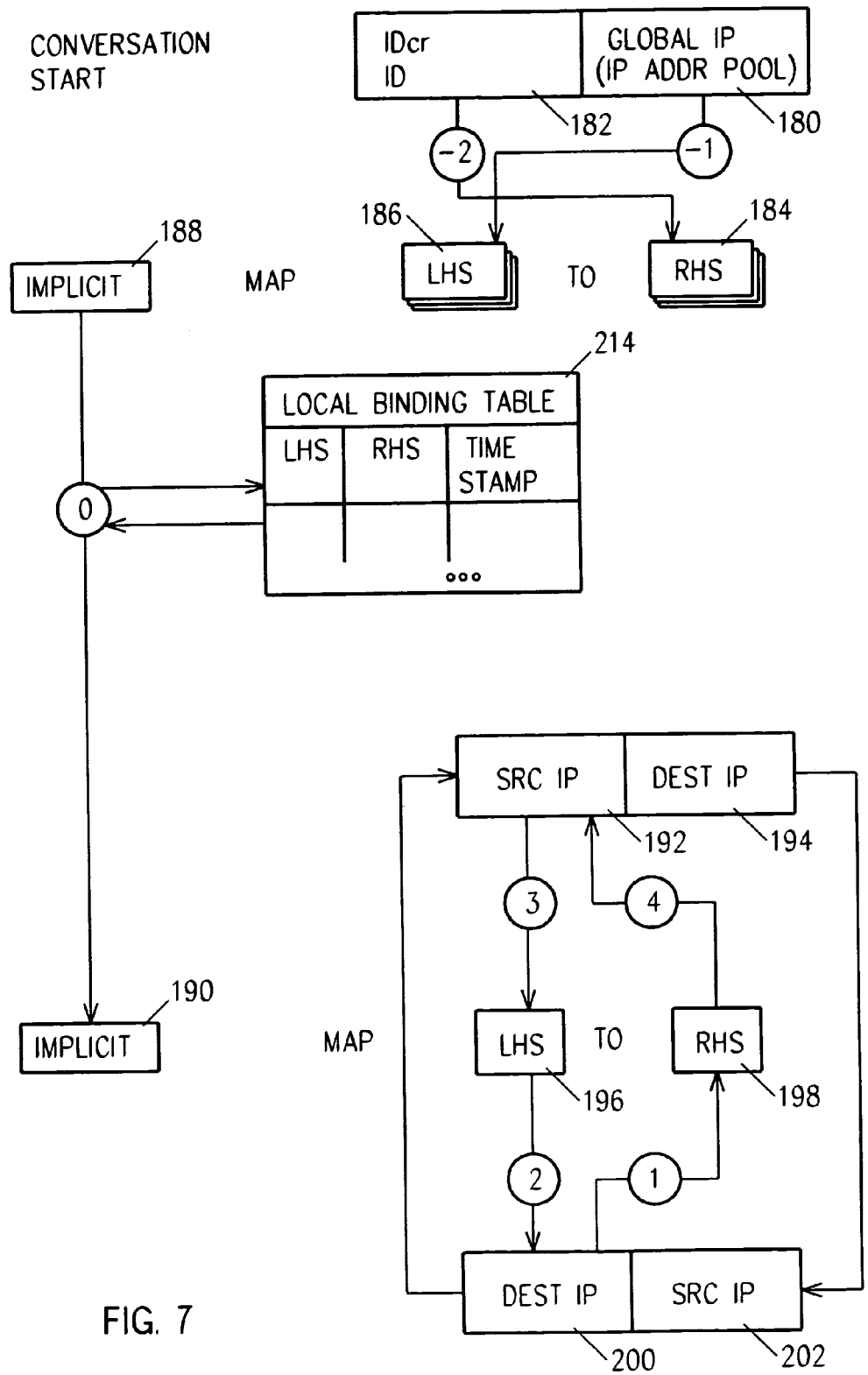
FIG. 7 illustrates VPN NAT, type d (aka 'destination-in'): IDcr translated for responder-mode conversations.

Referring to FIGS. 5, 6 and 7, lhs and rhs refer to sets, such as contiguous ranges, of IP addresses. Assuming that x is a set, then size(x) designates the number of elements in the set. Three cases are provided, as follows:

Case 1: size(lhs)=size(rhs)=1.
Case 2: size(lhs)=size(rhs)&size(lhs)>1.
Case 3: size(lhs) !=size(rhs).

Case 1 is handled by the system and method of the parent application, U.S. patent application Ser. No. 09/240,720.

In case 2, since the two sets are equal, the implicit MAP rule generated for each connection as it is started is inherent in the statement of the two sets. That is, there is a unique one-to-one correspondence between elements of the lhs and elements of the rhs. So, the generation of the implicit MAP rule for a particular VPN connection load is straightforward. For the process of FIG. 5, for example, for source out VPN NAT, the n'th element of the lhs set that matches the source IP (step 1) is found, then the n'th element of the rhs set is found and used to replace the source IP (step 2).

In case 3, a dynamic association (a binding) of the lhs element with the rhs element is generated based on previously generated bindings. A binding is generated as needed, by traffic, or an existing binding is used. A binding lasts for the duration of the connection or until an inactivity time-out value is reached. The bindings are of two types: local and remote, and are unique across the system.

Which case is determined once, per VPN connection, at the time it is started, and not recomputed for each datagram handled.

Referring to FIG. 5, the preferred embodiment of the invention for VPN NAT type a 'source-out' is illustrated. In VPN NAT, type a 'source-out', IDci is translated for initiator-mode conversations. After system generated implicit NAT rule 128<MAP lhs TO rhs> is loaded, it functions as static NAT. The key to making this work, is that the security associations negotiated by IKE use the implicit MAP 130 rhs 138. Hence, the SAs and the VPN NAT are synchronized.

Referring further to FIG. 5, for a locally initiated conversation, in step <-2>, since NAT is requested, implicit MAP rule 128 is created by copying local client ID 122 to lhs 126, and the rhs 124 is obtained from the appropriate pool 120. Step <0> is part of starting a VPN connection, and occurs during steps 24 and 26 (FIG. 1). In step <0>, after IKE negotiation is complete using rhs 124, implicit MAP rule 130 is loaded to the operating system kernel. This step <0> comprises the following steps; load the connection SA's, connection filter, and create blank version of table 210. For outbound processing, if in step <1> src ip 132 matches any particular lhs in implicit map rule 130, then in step <2> case 1, 2 or 3 (described above) is determined, resulting in a rhs 138 IP address. This selected rhs replaces source IP 132. An entry of the selected binding is made in the local binding table 210, if case 3. For inbound processing, if in step <3> dest ip address 140 matches a rhs in the local binding table 210, then in step <4> destination ip 140 is replaced by the lhs of the local binding table entry 210.

lhs and rhs are two sets of IP addresses. A VPN NAT rule consists of one each, that is, it defines a mapping of lhs addresses on rhs addresses: lhs -> rhs.

In step 26 (FIG. 1)+, responder mode connections are started. In so doing, IKE functions negotiate the SAs based on currently configured policy. When done, they are sent to the connection manager as a SA collection of 1 to n SA pairs.

In FIGS. 6 and 7, VPN NAT source-in and destination-in types are illustrated.

Figure 8:
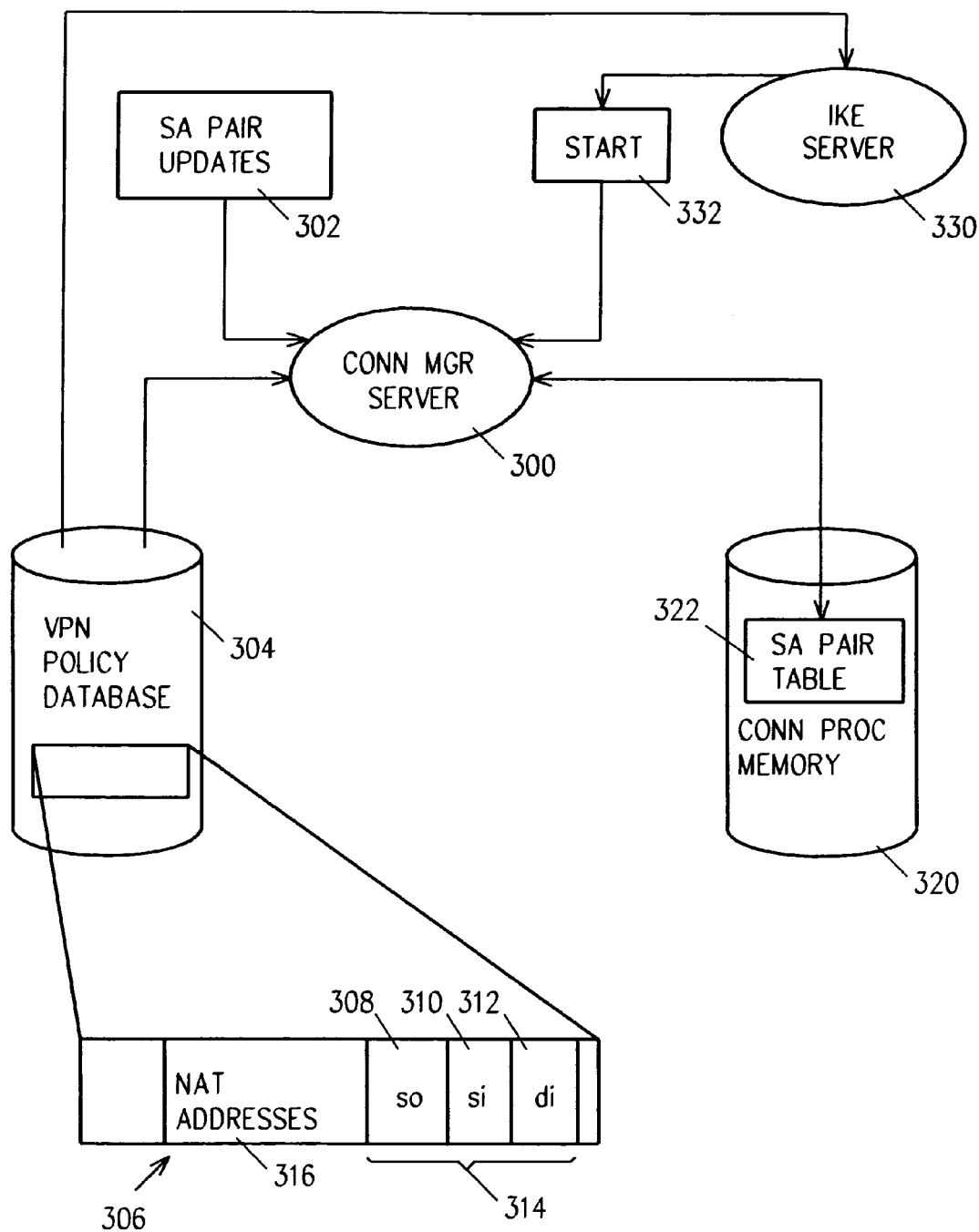
FIG. 8 is a high level flow diagram illustrated the relationships between various program and data elements implementing the system and method of the invention.

Referring to FIG. 8, the connection manager server 300, upon receiving the start message (msg) 332 from IKE server 330, looks at the connection definition 306 in the database 304 and checks the NAT flags 314. If one or more NAT remote flags so 308, si 310, or di 312 is 'on', then an IP address(es) 154 (FIG. 6), 186 (FIG. 7) is obtained from the appropriate NAT pool 50, 52 or 54 (FIG. 2), depending on NAT flag associated with the ID 152 in (FIG. 6), 182 (FIG. 7.)

The relationship between the NAT flag and NAT pools is; if source-out flag 308 is on or source-in flag 310 is on, pool type 52 (same type as 54) in FIG. 2 is used, selecting the pool based on remote VPN connection endpoint address. If destination-in flag 312 is on, pool 50 in FIG. 2 is used, indexed by destination address.

Management of IP address availability from the remote ID pool 150 is done by the connection manager based on its set of active connections (as for type a 'source-out' VPN NAT). Connection manager also handles availability for the IDcr pool 180 (FIG. 7), which allows load balancing. The IDcr pool 180 is a set of IP addresses for nat'ing IDcr. There are two basic approaches: (1) for every start search the pool 180 from the first entry; or, (2) for every start, the pool 180 is searched from the last used IP.

The load to IPSec occurs as in the initiator mode case above. When processing remotely initiated connection traffic, two address translations may occur for each inbound and outbound packet (source and destination).

Referring to FIG. 6, VPN NAT type c 'source-in' starts a responder-mode connection as follows: in step <-2>, implicit MAP rule 158<MAP lhs TO rhs> is created, by copying IDci 152 to rhs 154; and in step <-1>, by selecting ip address(es) from the appropriate pool 150 and copied to lhs 156. In step <0>, after IKE negotiation is complete using rhs 154, implicit rule 160 is loaded. This step <0> includes the following: same as above—step <0> is the same in all three VPN NAT types (except for some low-level details). When processing inbound datagrams, if in step <1> src ip 172 matches a rhs 168, in step <2>, source ip 172 is translated to corresponding lhs 166. Then, based on case 1, 2 or 3 (as described above), an entry is made in the remote binding table 212. When processing outbound datagrams, if in step <3> destination IP 164 matches lhs 166, then in step <4> destination ip 164 is translated to rhs 168. The lookup for IP 164 used the remote binding table, if case 3, else it uses the implicit MAP rule 160.

Referring to FIG. 7, VPN NAT d 'destination-in' type executes to translate IDcr for responder-mode conversations as follows: in step <-2> implicit MAP rule 188 is created, copying IDcr 182 to rhs 184. In step <-1>, ip address(es) are obtained from appropriate address pool 180 and copied to lhs 186. In step <0>, after IKE negotiations are completed using rhs 184, implicit MAP rule 190 is loaded. (Step <0> is the same as for FIGS. 5 and 6, except for low-level details.)

When processing inbound datagrams if in step <1> destination ip 200 matches rhs 198, in step <2> destination ip 200 is translated to lhs 196. When processing outbound datagrams if in step <3> source ip 192 matches lhs 196, in step <4> source ip 192 is translated to rhs 198.

Referring to FIG. 8, in step 28, when the connection manager 300 gets SA pair updates 302, it copies the new SA pair information to the SA pair table 322 in connection process memory 320.

In step 30, when ending a connection 34, 36, the connection manager 300 frees (makes available) any NAT IP addresses 52, 54 associated with the connection. Referring to FIG. 8, NAT IP addresses are removed from the appropriate list 316 maintained by the connection manager 300.

The size of the lhs and rhs sets is controlled by taking the minimum of three items: the subnet size (or address range) configured by the customer, the maximum concurrent VPN NAT sessions per connection configured by the customer on a per NAT pool basis, and the size of the largest remaining range of value still available in the originally configured pool. This is determined by the VPN connection manager during the startup of a connection (step 24 and 26, FIG. 1).

ADVANTAGES OVER THE PRIOR ART

It is an advantage of the invention that there is provided an improved and greatly simplified system and method for concurrently implementing both Network Address Translation (NAT) and IP Security (IP Sec).

It is a further advantage of the invention that there is provided a system and method for solving the increased likelihood of IP address conflicts inherent in the use of a virtual private network (VPN).

It is a further advantage of the invention that there is provided a system and method for enabling utilization of VPNs without requiring re-addressing a domain (an expensive alternative).

It is a further advantage of the invention that there is provided a system and method for VPN NAT which is accomplished entirely in the IP Sec gateway without requiring changes in domain hosts.

It is a further advantage of the invention that there is provided a system and method for VPN NAT which requires no, or only minor, changes to routing in each connected domain.

It is a further advantage of the invention that there is provided a system and method for VPN NAT which is simple to configure.

It is a further advantage of the invention that there is provided a solution to the address collision problems engendered by VPNs.

It is a further advantage of the invention that there is provided a simplified solution for customer configuration of VPN connections.

It is a further advantage of the invention that there is provided a system and method allowing a single VPN connection to support multiple VPN NAT rules.

It is a further advantage of the invention that there is provided a system and method which, on a system wide basis, avoids conflict among the implicitly, or dynamically assigned, VPN NAT rules.

It is a further advantage of the invention that there is provided a system and method which reduces system overhead in systems dynamic NAT rules by eliminating the need to manage numerous separate VPN connections for each NAT rule.

It is a further advantage of the invention that there is provided a VPN NAT system and method which simplifies network monitoring and traffic analysis.

It is a further advantage of the invention that there is provided a VPN NAT system and method which simplifies network monitoring and traffic analysis.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method of operating a virtual private network (VPN) based on IPsec that integrates network address translation (NAT) with IPsec processing, comprising the steps executed at one end of a VPN connection of:
    configuring a VPN NAT IP address pool on a VPN gateway machine at said one end of a VPN connection employing only IP address data available at said VPN gateway machine;
    configuring at said one end of said VPN connection a VPN connection to utilize said VPN NAT IP address pool;
    obtaining at said one end of said VPN connection a specific IP address from said VPN NAT IP address pool, and allocating said specific IP address for said VPN connection;
    starting said VPN connection;
    loading to an operating system kernel at said one end of said VPN connection the security associations and connection filters for said VPN connection;
    processing at said one end of said VPN connection a IP datagram for said VPN connection;
    applying VPN NAT at one end of said VPN connection to said IP datagram with source and destination port values after the application of VPN NAT being the same as before application of VPN NAT; and
    further for integrating NAT with IPsec for dynamically-keyed internet key exchange protocol (IKE) IPsec connections, comprising the further step of:
    configuring the VPN connections to obtain their keys automatically.

2. The method of claim 1, wherein said VPN connection is configured for outbound processing, and said applying step comprises outbound source IP Nating.

3. The method of claim 1, wherein said VPN connection is configured for some combination of inbound processing, and said applying step selectively comprises inbound source IP NATing or inbound destination IP NATing.

4. The method of claim 1, further for integration of NAT with IP Sec for manually-keyed IPsec connections, comprising the further step of manually configuring connection keys.

5. The method of claim 1, further for integrating NAT with IPsec Security Associations, negotiated dynamically by internet key exchange Protocol (IKE), wherein said starting step further comprises creating a message for IKE containing said IP address from said NAT pool; and further comprising the step of operating IKE to obtain dynamically negotiated keys.

6. The method of claim 5, further comprising the step of combining the dynamically obtained keys with said NAT pool IP address and wherein said loading step loads the result as security associations into said operating system kernel.

7. A computer implemented method for allowing the definition and configuration of NAT directly with definition and configuration of IPsec-based VPN connections and VPN policy, comprising the steps executed by a digital processor at one end of a VPN connection of:
    configuring at one end of said VPN connection the requirement for VPN NAT by a yes/no decision in a policy database for each of the three types of VPN NAT, said three types being VPN NAT type a outbound source IP NAT, VPN NAT type c inbound source IP NAT, and VPN NAT type d inbound destination IP NAT;
    configuring at said one end of said VPN connection on a VPN gateway machine at said one end of a VPN connection employing only IP address data available at said VPN gateway machine a remote IP address pool or a server IP address pool selectively responsive to said yes/no decision for each said VPN NAT type; and
    upon subsequent start of said VPN connection, processing inbound and outbound packets at said one end of said VPN connection responsive to configuration of said VPN NAT in said policy database and configuration of said remote IP address pool; and
    further for integrating NAT with IPsec for dynamically-keyed, internet key exchange protocol (IKE), IPsec connections, comprising the further step of:
    configuring the VPN connections to obtain their keys automatically.

8. The computer implemented method of claim 7, further comprising the step of configuring a unique said remote IP address pool for each remote address to which a VPN connection will be required, whereby said remote IP address pool is keyed by a remote ID.

9. The computer implemented method of claim 7, further comprising the step of configuring said server IP address pool once for a system being configured.

10. A computer implemented method of allowing a VPN NAT address pool to be associated with a gateway, thereby allowing server load-balancing, comprising the steps executed by a digital processor at one end of a VPN connection of:
    configuring at said one end of said VPN connection a server VPN NAT IP address pool for a system being configured;
    storing at said one end of said VPN connection specific IP addresses that are globally routable in said server VPN NAT IP address pool;
    configuring at said one end of said VPN connection a VPN connection to utilize said server VPN NAT IP address pool; and
    managing at said one end of said VPN connection total volume of concurrent VPN connections responsive to the number of addresses in said server VPN NAT IP address pool with source and destination port values before and after application of VPN NAT being the same; and
    further for integrating NAT with IPsec for dynamically-keyed, internet key exchange protocol (IKE), IPsec connections, comprising the further step of:
    configuring the VPN connections to obtain their keys automatically.

11. A computer system for operating a virtual private network (VPN) based on IPsec that integrates network address translation (NAT) with IPsec processing executed by a digital processor at one end of a VPN connection, comprising:
    means for configuring on a VPN gateway machine at said one end of a VPN connection a VPN NAT IP address pool employing only IP address data available at said VPN gateway machine;

means for configuring at said one end of said VPN connection a VPN connection to utilize said VPN NAT IP address pool;

means for obtaining at said one end of said VPN connection a specific IP address from said VPN NAT IP address pool, and allocating said specific IP address for said VPN connection;

means for starting said VPN connection at said one end of said VPN connection;

means for loading at said one end of said VPN connection to an operating system kernel the security associations and connection filters for said VPN connection;

means for processing at said one end of said VPN connection a IP datagram for said VPN connection;

means for applying at said one end of said VPN connection VPN NAT to said IP datagram with source and destination port values after application of VPN NAT being the same as before application of VPN NAT; and further for integrating NAT with IPsec for dynamically-keyed, internet key exchange protocol (IKE), IPsec connections, comprising the further step of:

configuring the VPN connections to obtain their keys automatically.

12. A system for definition and configuration of NAT directly with definition and configuration of VPN connections and VPN policy executed by a digital processor at one end of a VPN connection, comprising: Computer readable-medium embodying a policy database for configuring at said one end of said VPN connection the requirement for VPN NAT by a yes/no decision for each of the three types of VPN NAT, said three types being VPN NAT type a outbound source IP NAT, VPN NAT type c inbound source IP NAT, and VPN NAT type d inbound destination IP NAT; and a remote IP address pool or a server IP address pool at said one end of said VPN connection selectively configured on a VPN gateway machine at said one end of a VPN connection responsive to said yes/no decision for each said VPN NAT type employing only IP address data available at said VPN gateway machine;

upon subsequent start of said VPN connection, processing inbound and outbound packets at said one end of said VPN connection responsive to configuration of said VPN NAT in said policy database and configuration of said remote IP address pool; and further for integrating NAT with IPsec for dynamically-keyed, internet key exchange protocol (IKE), IPsec connections, comprising the further step of:

configuring the VPN connections to obtain their keys automatically.

13. A system implemented at one end of a VPN connection for allowing a VPN NAT address pool to be associated with a gateway, thereby allowing server load-balancing, comprising:

a server VPN NAT IP address pool on a VPN gateway machine at said one end of a VPN connection configured for a given system being configured for containing multiple addresses configured as a range, as a list of single addresses, or any combination of multiple ranges and single addresses employing only IP address data available at said VPN gateway machine;

said server VPN NAT IP address pool storing specific IP addresses that are globally routable;

a VPN connection at said one end of said VPN connection configured to utilize said server VPN NAT IP address pool; and a connection controller for managing at said one end of said VPN connection total volume of concurrent VPN connections responsive to the number of addresses in said server VPN NAT IP address pool with source and destination port values after application of VPN NAT being the same as before application of VPN NAT; and further for integrating NAT with IPsec for dynamically-keyed, internet key exchange protocol (IKE), IPsec connections, comprising the further step of:

configuring the VPN connections to obtain their keys automatically.

14. A program storage device readable by a machine, tangibly embodying a program of instructions executable by a machine to perform method steps executed at one end of a VPN connection for operating a virtual private network (VPN) based on IPsec that integrates network address translation (NAT) with IPsec processing, said method steps comprising:

configuring on a VPN gateway machine at said one end of a VPN connection a NAT IP address pool employing only IP address data available at said VPN gateway machine;

configuring at said one end of said VPN connection a VPN connection to utilize said VPN NAT IP address pool;

obtaining a specific IP address from said VPN NAT IP address pool, and allocating at said one end of said VPN connection said specific IP address for said VPN connection;

starting said VPN connection at said one end of said VPN connection;

loading to an operating system kernel at said one end of said VPN connection the security associations and connection filters for said VPN connection;

processing at said one end of said VPN connection a IP datagram for said VPN connection; and applying at said one end of said VPN connection VPN NAT to said IP datagram with source and destination port values after application of VPN NAT being the same as before application of VPN NAT; and further for integrating NAT with IPsec for dynamically-keyed, internet key exchange protocol (IKE), IPsec connections, comprising the further step of:

configuring the VPN connections to obtain their keys automatically.

15. An article of manufacture comprising:

a computer useable medium having computer readable program code means embodied therein for operating a virtual private network (VPN) based on IPsec that integrates network address translation (NAT) with IPsec processing executed at one end of a VPN connection, the computer readable program means in said article of manufacture comprising:

computer readable program code means for causing a computer to effect configuring a VPN NAT IP address pool on a VPN gateway machine at said one end of a VPN connection employing only IP address data available at said VPN gateway machine;

computer readable program code means for causing a computer to effect configuring at said one end of said VPN connection a VPN connection to utilize said VPN NAT IP address pool;

computer readable program code means for causing a computer to effect obtaining at said one end of said VPN connection a specific IP address from said VPN NAT IP address pool, and allocating said specific IP address for said VPN connection;

computer readable program code means for causing a computer to effect starting at said one end of said VPN connection said VPN connection;

computer readable program code means for causing a computer to effect loading at said one end of said VPN connection to an operating system kernel the security associations and connection filters for said VPN connection;

computer readable program code means for causing a computer to effect processing at said one end of said VPN connection a IP datagram for said VPN connection; and computer readable program code means for causing a computer to effect applying at said one end of said VPN connection VPN NAT to said IP datagram with source and destination port values after the application of VPN NAT being the same as before application of VPN NAT; and further for integrating NAT with IPsec for dynamically-keyed, internet key exchange protocol (IKE), IPsec connections, comprising the further step of:

configuring the VPN connections to obtain their keys automatically.

16. A computer implemented method for providing IP security in a virtual private network using network address translation (NAT), comprising the steps executed by a digital processor at one end of a VPN connection of:

dynamically generating at said one end of said VPN connection NAT rules and associating them selectively with manual and dynamically generated, internet key exchange protocol (IKE), Security Associations, comprising the further step of:

configuring the VPN connections to obtain their keys automatically; thereafter beginning at said one end of said VPN connection IP security that uses the Security Associations; and then as IP security is performed on outbound and inbound datagrams, selectively performing at said one end of said VPN connection one or more of VPN NAT type a outbound source IP NAT, VPN NAT type c inbound source IP NAT, and VPN NAT type d inbound destination IP NAT on said outbound and inbound datagrams, so as to provided said IPsec for communication conducted in said VPN.

17. The method of claim 1, said VPN NAT IP address pool containing multiple addresses configured as a range, as a list of single address, or any combination of multiple ranges and single addresses.

* * * * *